US008442846B2

United States Patent
Nesgos

(10) Patent No.: US 8,442,846 B2
(45) Date of Patent: May 14, 2013

(54) SYSTEM AND METHOD FOR MANAGING INVESTMENT RISK IN SATELLITE OPERATOR COMPANIES

(71) Applicant: Peter D. Nesgos, New York, NY (US)

(72) Inventor: Peter D. Nesgos, New York, NY (US)

( * ) Notice: Subject to any disclaimer, the term of this patent is extended or adjusted under 35 U.S.C. 154(b) by 0 days.

(21) Appl. No.: 13/645,119

(22) Filed: Oct. 4, 2012

(65) Prior Publication Data

US 2013/0030846 A1     Jan. 31, 2013

Related U.S. Application Data

(63) Continuation-in-part of application No. 13/373,648, filed on Nov. 23, 2011, which is a continuation of application No. 12/072,038, filed on Feb. 22, 2008, now Pat. No. 8,069, 065.

(60) Provisional application No. 60/892,096, filed on Feb. 28, 2007.

(51) Int. Cl.
    *G06Q 40/00*      (2006.01)

(52) U.S. Cl.
    USPC ............... 705/4; 705/38; 705/35; 705/37

(58) Field of Classification Search ............ 705/4, 35, 705/37–38
See application file for complete search history.

(56) References Cited

U.S. PATENT DOCUMENTS

| | | | |
|---|---|---|---|
| 6,192,347 B1 | 2/2001 | Graff | |
| 7,386,463 B2 | 6/2008 | McCabe | |
| 7,516,079 B2 * | 4/2009 | Harrison et al. | 705/4 |
| 7,587,325 B1 | 9/2009 | Scott | |
| 2002/0010684 A1 | 1/2002 | Moskowitz | |
| 2003/0028456 A1 | 2/2003 | Yolles | |
| 2004/0236676 A1 * | 11/2004 | Takezawa et al. | 705/38 |
| 2005/0055248 A1 | 3/2005 | Helitzer et al. | |
| 2005/0251478 A1 | 11/2005 | Yanavi | |

OTHER PUBLICATIONS

Insurance Firms Hire NASA to Find Two Satellites; Wall Street Journal; New York, NY Oct. 23, 1984.
Shaprio, Stacy, "Abundance of Capacity Reducing Satellite Rates" Business Insurance; May 5, 1997, vol. 31, Issue 18, p. 32.
International Search Report PCT/US08/05231, Jul. 14, 2008.
Sky risks loss of satellite; [2 Edition] Vaughan, Gareth, The Press, Christchurch, New Zealand; Sep. 13, 2006. p. c.1.

* cited by examiner

*Primary Examiner* — Harish T Dass
(74) *Attorney, Agent, or Firm* — Milbank, Tweed, Hadley & McCloy LLP

(57) ABSTRACT

In order to mitigate risk of satellite investment loss, a satellite loss event or failure event for a satellite that will be operated by a satellite operator company is identified. Actuarial data corresponding to prior satellite loss events or failure events substantially corresponding to the satellite loss event or failure event are identified. An investment loss mitigation insurance policy based at least in part on the identified actuarial data is developed. The investment loss mitigation insurance policy includes a salvage provision. The investment loss mitigation insurance policy is offered to the identified financial investors. The investment loss mitigation insurance policy is placed with an underwriting pool.

27 Claims, 8 Drawing Sheets

SYSTEM AND METHOD FOR MANAGING INVESTMENT RISK IN SATELLITE OPERATOR COMPANIES

This application is a continuation in part of and claims priority to co-pending U.S. application Ser. No. 13/373,648, entitled System and Method for Managing Investment Risk in Satellite Operator Companies filed on Nov. 23, 2011, which is a continuation of U.S. application Ser. No. 12/072,038 (issued on Nov. 29, 2011 as U.S. Pat. No. 8,069,065) entitled System and Method for Managing Investment Risk in Satellite Operator Companies filed on Feb. 22, 2008, which claims priority to U.S. Provisional Application Ser. No. 60/892,096, entitled System and Method for Managing investment Risk in Satellite Operator Companies, filed Feb. 28, 2007, the disclosures of which are incorporated herein by reference.

The present invention relates to investment protection insurance and more particularly to systems and methods to quantify risk for, determine premium rates for and aggregate and protect equityholders and debtholders in publicly and privately traded securities for loss of investment in satellite operator companies in the event of total or partial loss of satellites.

BACKGROUND

Property insurance covering loss or failure of satellites has existed for more than forty years. This insurance is first party property insurance to compensate the owner of a satellite in the event of the total or partial loss of its satellite either as a result of a failure at launch or during the in-orbit lifetime of the satellite. This insurance customarily covered the capital cost of the satellite, the price of the launch services (in the case of launch insurance) and the cost of the premium, usually on an agreed value basis (in the case of launch insurance) or based on the declining net book value of the satellite (in the case of in-orbit insurance). At one time in the past, this insurance included a component of business interruption loss and extra expenses incurred in securing replacement capacity or modifying ground equipment to accommodate satellite deficiencies. This insurance has been underwritten traditionally by a specialist property insurance market.

More recently, coverage has been placed on a one-off basis by a single bondholder in a satellite project on an agreed value basis, rated and with coverage terms substantially equivalent to satellite operator property launch insurance. However, the terms of the policy, method of placement and other details of the process for issue of the policy differ significantly from the terms, method of placement and other details described herein.

Equity shareholders and bondholders in publicly and privately traded securities of satellite operators still remain unprotected from the possible drastic diminution in value of their securities resulting from the loss or failure of satellites owned by the satellite operators in which they have invested. This is because of the significant cost of procuring a separate policy of insurance rated on the same basis as the property insurance of the satellite operator, for relatively small amounts of insurance on an agreed value basis, whereas the rating should more properly be determined based on the likely diminution in value of the securities (versus the loss of the satellite) based on historical experience and for the actual diminution in value of the securities versus an agreed value that may have no bearing on the actual loss suffered.

The preceding description is not to be construed as an admission that any of the description is prior art relative to the present invention.

SUMMARY OF THE INVENTION

In various aspects, the system and method mitigate risk of satellite investment loss. The system and method comprise identifying at least one satellite loss event or failure event for a satellite that will be operated by a satellite operator company. The system and method further comprise identifying actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure. The system and method further comprise developing an investment loss mitigation insurance policy based at least in part on the identified actuarial data, including a salvage provision within the investment loss mitigation insurance policy, wherein the salvage provision is effective upon total loss of value in the debt or equity instruments. The system and method further comprise offering the investment loss mitigation insurance policy to financial investors holding debt or equity instruments of the satellite operator company. The system and method further comprise placing the investment loss mitigation insurance policy with an underwriting pool.

In another aspect, the system and method further comprise identifying an actual satellite loss event or failure event, determining whether the actual satellite loss event or failure event is covered by the investment loss mitigation insurance policy, and responsive to determining that the actual satellite loss event or failure event is covered, paying the financial investors. In another aspect, the system and method further comprise identifying an actual satellite loss event or failure event, determining whether the debt or equity instruments of the satellite operator company have suffered a total loss of value, determining whether the underwriting pool has salvage rights under the investment loss mitigation insurance policy, and responsive to determining that debt or equity instruments have suffered a total loss of value and that the underwriting pool has salvage rights, transferring financial instruments to the underwriting pool as salvage. In another aspect of the system and method, the at least one satellite loss event or failure event is a launch failure. In another aspect of the system and method, the at least one satellite loss event or failure event is a launch loss. In another aspect of the system and method, the at least one satellite loss event or failure event is an in-orbit failure. In another aspect of the system and method, the at least one satellite loss event or failure event is a premature in-orbit loss of capacity. In another aspect of the system and method, offering the investment loss mitigation insurance policy to financial investors occurs a predetermined number of days before launch. In another aspect of the system and method, offering the investment loss mitigation insurance policy to financial investors occurs after successful in-orbit check-out and a predetermined number of days before annual expiry. In another aspect of the system and method, the underwriting pool is at least partially in a financial products market. In another aspect of the system and method, the underwriting pool is at least partially in a satellite property insurance underwriting market. In another aspect of the system and method, identifying actuarial data corresponding to prior satellite loss events or failure events substantially corresponding to the at least one satellite loss event or failure event considers an agreed value of investment based on a set financial instrument value. In another aspect of the system and method, identifying actuarial data corresponding to prior satellite loss events or failure events substantially corresponding to the at least one satellite loss event or failure event considers an intrinsic value of investment based on recognized value metrics or methodologies. In another aspect of the system and method, the final pool of investors and the adjusted value of their investment in the satellite operator and the final insured amount at the time of attachment of risk is determined. In another aspect of the system and method, the at least one satellite loss event or failure event for a satellite is a total loss. In another aspect of the system and method, the at least one satellite loss event or failure event for a satellite is a partial loss. In another aspect of the system and method, the at least one satellite loss event or failure event for a satellite is a reduction in expected lifetime. In another aspect of the system and method, the at least one satellite loss event or failure event for a satellite is a reduction in available power. In another aspect of the system and method, debt or equity securities are transferred from the underwriting pool to a remarketing agent, at a discount.

In various aspects, the system and method mitigate risk of satellite investment loss. The system and method comprise identifying at least one satellite loss event or failure event for a satellite that will be operated by a satellite operator company. The system and method further comprise identifying actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure. The system and method further comprise developing an investment loss mitigation insurance policy based at least in part on the identified actuarial data, including a salvage provision within the investment loss mitigation insurance policy, wherein the salvage provision is effective upon partial loss of value in the debt or equity instruments. The system and method further comprise offering the investment loss mitigation insurance policy to financial investors holding debt or equity instruments of the satellite operator company. The system and method further comprise placing the investment loss mitigation insurance policy with an underwriting pool.

In another aspect, the system and method further comprise identifying an actual satellite loss event or failure event, determining whether the debt or equity instruments of the satellite operator company have suffered a partial loss of value, determining whether the underwriting pool has salvage rights under the investment loss mitigation insurance policy, and responsive to determining that debt or equity instruments have suffered a partial loss of value and that the underwriting pool has salvage rights, sharing any future upside in financial performance as salvage.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
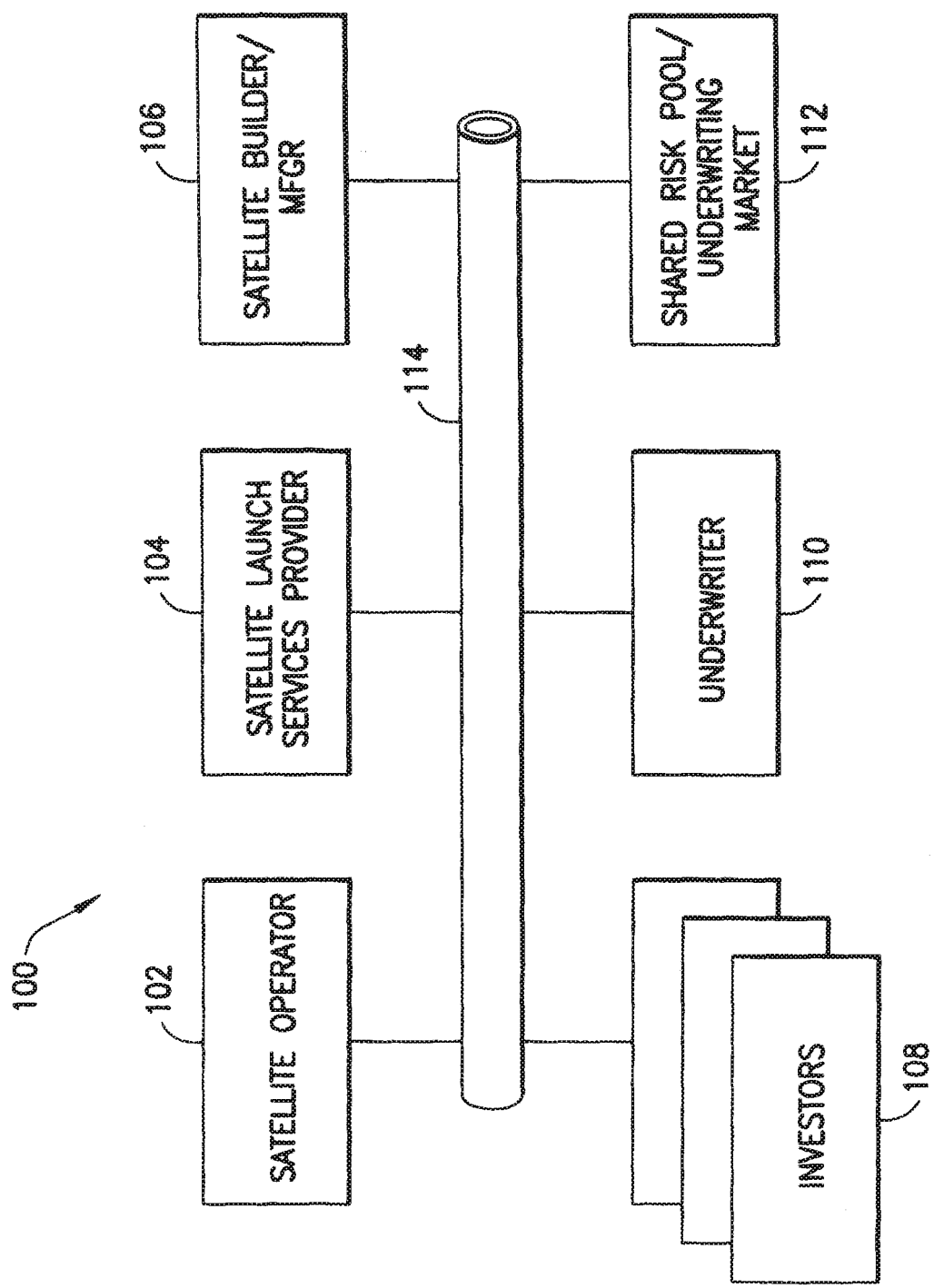
FIG. 1 illustrates a system according to an example embodiment.

It is understood that the drawings are for illustration only and are not limiting.

DETAILED DESCRIPTION OF THE DRAWINGS

In the various described embodiments, systems and methods provide insurance to protect against loss of investment value of a shareholder or bondholder of a satellite operator with publicly or privately traded securities resulting from catastrophic loss or failure of a satellite at launch or while in orbit.

Differences from Prior Forms of Protection

The systems and methods of the various described embodiments are different from other prior or known forms of protection. By way of example, in one or more embodiments, the system and method is designed for financial investors in publicly and privately traded satellite operator companies (although it is not limited to this class of insured).

In one or more embodiments, the system and method is offered to all or nearly all investors creating an insured pool or group, thereby reducing potential insurance capacity issues (i.e. numerous individual investors seeking more insurance than is available with respect to the same risk, or multiple potential insureds using different policy terms and conditions). The placement process may be unique in that it entails the aggregation of insureds by an offer to subscribe to a particular placement during a predetermined period of time, such as 30-90 days before launch or, for in-orbit insurance, such as 30-90 days before annual expiry. The terms of the participation of investors as represented by the agent would be embodied in a separate investor agency agreement. The insurance could be placed in conjunction with the satellite operator placement, but it is not necessarily so placed.

In one or more embodiments, coverage under the system and method may be placed in the financial products as well as the satellite property insurance underwriting markets.

In one or more embodiments, insurance under the system and method may be available for launch and initial in-orbit placement and for in-orbit risks while a satellite is in orbit.

In one or more embodiments, coverage under the system and method may apply to satellites (or a payload thereof) that satellite operators own or to satellites that satellite operators lease or purchase all (or a significant proportion) of the capacity thereon.

In one or more embodiments, insurance under the system and method may be rated based on historical share and bond performance after a satellite loss or failure versus on the loss experience for the satellite and, in the case of launch coverage, its launch vehicle.

In one or more embodiments, loss under the system and method may be determined based on one of the following: (1) the difference between average share/bond performance for a period of time immediately before and after a satellite loss or failure; (2) an agreed value of the investment based on a set share or bond price; or (3) the intrinsic value of the stock or debt of the company based on recognized value metrics or methodologies.

In one or more embodiments, types of loss scenarios covered under the system and method may be varied, depending on the insured's requirements: total loss only; total/constructive total loss; comprehensive; total/constructive total/partial loss; reduction in expected lifetime; reduction in available power.

In one or more embodiments, the period of coverage under the system and method may be varied, depending on the insured's requirements: e.g., launch through separation; launch through in-service acceptance, launch plus one year, annual for in-orbit.

In one or more embodiments, salvage available to insurers under the system and method may be different from satellite property insurers as it would be based on a transfer of the shares or bonds for which a loss has been paid or a sharing of any future upside in share/bond performance, such as in the case of partial loss coverage.

In one or more embodiments, separate arrangements under the system and method may be structured with insurers and one or more distressed equity/debt fund buyers to facilitate the sale of any shares/bonds that insurers have received as salvage.

In one or more embodiments, separate arrangements under the system and method may be arrived at with satellite manufacturers and launch services providers to assist in the description of the risk at underwriter presentations (either in conjunction with the satellite operator placement or separately) and in the presentation and settlement of any claim.

In one or more embodiments, separate agreements under the system and method may be developed with the satellite operator whereby the operator would share loss formulations, provide insureds with notices of occurrence and proofs of loss and assist in claims settlement.

Example Methods to Identify Actuarial Data

In one or more embodiments, the system and method may use various different methods to identify actuarial data corresponding to prior satellite loss events or failure events. By way of example, the system and method may undertake a study of share/bond performance of satellite operators based on performance of shares/bonds before and after satellite loss or failure. Such a study may involve total and partial losses and also different size satellite operators (those that operate one or a small number of satellites versus those that operate a large fleet). Such a study may also consider performance of shares/bonds after successful launch to determine value enhancement. Such a study may also run sensitivity analyses based on different criteria to determine whether additional factors influence share/bond performance (e.g., market served, competition, capacity pricing, availability of replacement capacity) and weight factors based on an agreed formula.

In one or more embodiments, the system and method may also determine a premium rating based on historical investment loss data not on satellite/launch vehicle failure data (e.g., rate for multi-satellite operator should be far less than for a single satellite operator whether or not satellite is considered risky).

In one or more embodiments, the system and method may retain a share/bond-tracking agent or consultant to provide and maintain current lists of satellite operator shareholders and bondholders of publicly and privately traded satellite operators.

In one or more embodiments, the system and method may conduct an assessment of distressed value (post loss) and set up a facility for insurers to trade back bonds to vulture funds, for a commission payable by insurers to placing broker.

Example Methods to Place Coverage

In one or more embodiments, the system and method may use various different methods to place coverage with an underwriting pool. By way of example, in one or more embodiments, the system and method may select licensed, experienced space insurance broker(s) to place insurance. In one or more embodiments, the system and method may also identify lead underwriter(s) knowledgeable in financial risks and satellite coverages. In one or more embodiments, the system and method may establish a pool of rated underwriters to market placements. In one or more embodiments, the system and method may monitor launch activity involving publicly and privately traded satellite operators and timely approach prospective insureds. In one or more embodiments, the system and method may identify risk profile, involving coverage period, loss formulation and insured value. In one or more embodiments, the system and method may establish an insured group. In one or more embodiments, the system and method may negotiate investor agency agreements regarding identifying insured parties, insured securities, relative shares/premium obligations, loss formula and obligations of agent. In one or more embodiments, the system and method may coordinate underwriter presentations independently or in conjunction with the satellite operator. In one or more embodiments, the system and method may develop an appropriate rating, conclude the policy, and complete placement.

Example Methods for Policy Development

In one or more embodiments, the system and method may use various different methods to develop the underlying policies. By way of example, in one or more embodiments, the system and method may develop modular, standard form policy adaptable to various risk profiles. In one or more embodiments, the system and method may develop an approach to definition of what constitutes loss or failure matching or based on satellite operator's insurance (or default to or cross-reference satellite operator's policy). In one or more embodiments, the system and method may tailor conditions standard in satellite property policies to nature of insured group (e.g., no due diligence condition and limited insureds' duties regarding notice of occurrence and proof of loss (link to satellite operator obligations under separate satellite operator insurance)). In one or more embodiments, the system and method may provide a form of breach of warranty cover whereby the insured group may rely on the launch or in-orbit insurance policy of the satellite operator but not be deemed coverage under its separate investment protection insurance in the event an act or omission of the satellite operator voids or nullifies its own coverage. In one or more embodiments, the system and method may provide that salvage for insurers upon payment of the claim would be the shares or bonds held by the insured in the event of full coverage and total/constructive total loss (or no salvage or shared/all upside if shares/bonds trade up over time for partial losses, if covered). This may also include creation of a distressed sale facility with a vulture fund. In one or more embodiments, the system and method may consider creating a standard form agreement with a satellite operator for coordinated placement of the policy and satellite operator launch/in-orbit insurance including placement strategy, underwriter presentations, determination of loss definitions and responsibilities for preparing and filing notices of occurrence and proofs of loss.

Example Methods for Salvage

In one or more embodiments, the system and method may include provisions under the investment protection insurance policy providing salvage rights for the underwriters, taking the form of transferring financial instruments (securities) to the underwriters for which a claim for loss has been made or a sharing of any future upside in share/bond performance, such as in the case of a partial loss. In one or more embodiments, the availability of salvage to underwriters may influence the premium rate charged by them for the investment protection insurance policies they underwrite.

Example of Salvage Rights Based on Extent of Loss

In one or more embodiments, the system and method may consider whether there has been a total or a partial loss claimed in determining the nature of the available salvage. In one or more embodiments, the loss claimed is not necessarily based on the proper functioning of the satellite (see first trigger event as described elsewhere) but on the performance of the investment security (stock or bond) (see second trigger event described elsewhere). In one or more embodiments, only if there is complete loss of value in the investment security will the available salvage be the actual security itself. This implies a transfer of rights, title and interest in and to the investment security from the insured investor to the underwriters upon payment of a claim, in accordance with the terms of the investment protection insurance policy. While the salvage value in an investment security that has suffered a complete loss of value would be considered to be zero, experience has shown that debt securities retain intrinsic value even through a bankruptcy process involving a reorganization. Equity securities fare less well but may also retain some value through a reorganization proceeding.

In one or more embodiments, the nature of the salvage right in the case of investment securities suffering a partial diminution in value (e.g. where the stock price of the satellite operator company suffering a satellite failure loses some quantifiable value) is not an assignment of title in and to the investment security. Rather, salvage in the context of a partial loss is a prospective sharing of any improved performance over time of the investment security that is the subject of coverage. Whether or not the insured investor allows for salvage under its investment protection insurance policy in the partial loss scenario is a matter of negotiation with the underwriters and is reflected in the final premium charged. As well, an added refinement of the salvage rights in the context of a partial loss is the determination of: (1) the portion of sharing as between the insured investor and the underwriters (e.g. 50/50 or 75/25) as well as the period of performance over which the sharing is determined (e.g., whether the stock or bond price will be examined over a period of three, six or twelve months after the loss date or whether the determination is made based on the average performance over a pre-scribed period of time) and, assuming the value would have increased, how best to share the upside with the underwriters at that time (e.g. whether the security would be liquidated and profits shared or whether underwriters would be entitled to their share only upon sale, if and when that occurs and which party bears the risk of subsequent diminished value). In one or more embodiments, the underwriters benefit from a collateral security interest in the investment securities to the extent of their rights in any upside performance. Alternatively, the underwriters are provided options to call the investment securities at certain prescribed times, likely only if the securities would then be "in the money". Salvage in the partial loss scenario presents greater complexity than in the total loss scenario and has numerous permutations that are factored into the system and method for managing investment risk.

Example of Salvage Management

In one or more embodiments, salvage for total loss can be managed, streamlined and maximized. The underwriters under the investment protection insurance policy are generally not engaged in the business of remarketing securities and will not likely have ready access to prospective buyers of distressed securities, such as so-called vulture funds. To provide for this, in one or embodiments, the system and method create a remarketing agency agreement giving underwriters that are salvage beneficiaries, as transferees of investment securities, the avenue of selling their interests to a remarketing agent, at a discount. In this way, underwriters can expeditiously monetize their salvage interest and the remarketing agent has the responsibility (and assumes the risk) of finding buyers able to assess the value and risk of the investment securities.

Example Methods for Loss Event Triggers

In one or more embodiments, the system and method for identifying an actual satellite loss event or failure event, determine whether the event is covered by the investment protection insurance policy and whether a claim is payable to the financial investors as insureds. An important clarification as to the system and method of coverage is the loss formulations included in the investment protection insurance policies. This involves a "double trigger" event. The first or initial trigger is a physical loss of or damage to the satellite resulting from the malfunction of the launch vehicle transporting the satellite or a mechanical or operational malfunction of the satellite, occurring during launch, during initial in-orbit testing or thereafter during the operational life of the satellite in-orbit. Without this first or initial threshold trigger event or occurrence, there can be no further progress to the second trigger event, which is the actual diminution in value of the investment security (share or bond) as determined on the date of determination. These are two separate trigger events and the second trigger event need not result from or be related to the first trigger event. In other words, there is no need to demonstrate causality between the first and second trigger events. This allows a streamlined claims process and simplifies the basis for making the claim. The first trigger event is a technical formulation based on the satellite performance specifications as specified in the satellite purchase agreement. The second trigger event is a determination made by reference to the trading price of the security available on a public stock exchange or based on a recognized market database or as determined by a valuation expert.

Example Methods for Calculating Determination Dates for Loss Amount

In one or more embodiments, the system and method provide the formulation for calculating the loss amount based on the performance of the investment securities that are insured. In the case of investment protection launch coverage, involving a specific satellite launch event, the method of calculation of the insured value of the investment securities requires establishing the market price of the investment security as of the business day preceding the launch and the average market price over a delineated period of time following the launch. In the case of investment protection in-orbit coverage, involving the operation of a specific satellite or fleet of satellites over the course of a period of time (e.g. annually), the method of calculation of the insured value of the investment securities requires establishing the market price of the investment securities as of the business day preceding the total, constructive total or partial loss of the subject satellite or satellites and the average market price over a specified period of time following the loss event. The difference in these price amounts dictates whether a loss claim is payable under the investment protection insurance policy. For publicly traded securities, the price is determined based on the published exchange price. For non-publicly traded securities, the price is determined based on recognized private databases or by independent valuation experts. The methodology selected of taking a running average is to avoid uncorrelated price performance on any given day and rather track performance over the period following the event. Selecting the period of time will also be the subject of determination as the longer the period of time following the loss event, the greater likelihood there will be that the investment securities price will be affected by factors extraneous to the loss event itself, which may be specific to the satellite operator company or which are related to macro-economic factors or political events affecting securities prices generally in the marketplace. As well, experience has shown that the longer the period, the greater the likelihood that the investment securities price will stabilize after an expected drop surrounding the public announcement of a satellite failure. Underwriters can develop a premium calculation formula based on the period of coverage and the investors have the ability to select a period that corresponds to their risk appetite. For example, the period could range from 30 to 120 days. The investment protection insurance policy can also be structured to permit one or more extensions of the period of coverage with additional premium amounts payable as the coverage period is extended.

Example Methods Determining Scope of Coverage

In one or more embodiments, the system and method determine the type of coverage, being total loss, constructive total loss or partial loss. This refers to the first trigger event described elsewhere. In one or more embodiments, the system and method accommodate insured preferences and attendant premium cost by differentiating type of coverage, duration of coverage and scope of coverage. Specifically, the investment protection insurance can apply only to certain types of loss events that are considered by the investor/prospective insured likely to have an impact on its investment. Therefore, the investor/insured may choose to limit the first trigger event to total loss only of the satellite, thereby assuming the risk of investment loss if the satellite suffers a constructive total loss or partial loss. The investor/insured may choose to seek coverage for a specific launch or a specific satellite over a narrowly defined period of time. Alternatively, the investor/insured may choose to benefit from coverage extending over a fleet of satellites such that the loss of any one or more within the fleet would trigger the basis for a claim. This may include a satellite "excess-of-loss" deductible which may be desirable depending on the satellite operator company's fleet size and composition. Other deductible structures may include dollar amount deductibles (whereby the investor/insured bears a level of financial loss) and satellite failure deductibles whereby a threshold level of performance loss would result in the absence of a first trigger event. In one or more embodiments, the scope of coverage in the system and method relates to the imposition of a "collar"-based loss whereby no claim is made where the investment securities trade within a range following the satellite loss event. Finally, in one or more embodiments, the system and method contemplate both "follow-form," and "stand-alone" investment protection insurance policies. The scope of coverage can be structured to combine investment protection coverage into the satellite operator company's own first party property satellite insurance coverage by bifurcating and separating the insured amounts and the named insureds and sharing common terms. This improves efficiencies in placement and claims adjustment where the insurers for both types of insurance are common.

Example Investor Agreement to Facilitate New Investment

In one or more embodiments, the system and method provide a placement process that entails the aggregation of insured investors by an offer to subscribe to a particular placement during a predetermined period of time. The terms of the participation of investors as represented by the agent are embodied in a separate investor agreement. The insurance can be placed in conjunction with the satellite operator company placement, but not necessarily. Further refinement of this process relates to the use of this investment protection method to enhance the creditworthiness of a satellite operator company and thereby facilitate financing for one or more specific satellites. Where the satellite operator company seeks to raise additional equity investment or debt financing to support capital expenditures for new satellites, one or more embodiments of the system and method facilitate the securing of the additional investment but provide investors the opportunity to subscribe to an investment protection insurance policy to protect investment loss in the event that the financed satellite fails at launch or thereafter. Since the investors have recourse to insurance to cover loss of investment value, the pricing of the investment or financing is enhanced. The investment protection insurance policy can be arranged by the satellite operator company for the benefit of prospective investors (who may or may not choose to subscribe) and the cost of the insurance can be factored into the overall cost of the satellite financing. Refinement of the investor agreement whereby the investment protection can be arranged in advance of the financing campaign and offered as a credit enhancement is an additional feature of one or more embodiments of the system and method. In this way the system and method can be used to facilitate new financing and encourage new investors to participate and not simply be available to protect existing investment in satellite operator companies.

Example System

Referring to FIG. 1, an example of system 100 according to one embodiment of the invention includes satellite operator 102, satellite launch services provider 104, satellite builder/ manufacturer 106, investors 108, underwriter(s) 110, and shared risk pool/underwriting market 112. In system 100, satellite operator 102, satellite launch services provider 104, satellite builder/manufacturer 106, investors 108, underwriter(s) 110, and shared risk pool/underwriting market 112 are electronically interconnected by network 114. Although not illustrated, satellite operator 102, satellite launch services provider 104, satellite builder/manufacturer 106, investors 108, underwriter(s) 110, and shared risk pool/underwriting market 112 include various forms of computers and associated peripherals and components. These may be general or special purpose computers, each with one or more central processing units (CPU), fixed or removable storage for program code and program data (hard drive, floppy drive, CD, DVD, etc.), volatile and non-volatile memory, I/O devices (keyboards, display screens, printers, pointing devices, etc.), and network interface devices (WiFi, Ethernet, Modem, etc.). Network 114 may be one or more of a local area network (LAN), a wide area network (WAN), the Internet, or the public switched telephone network (PSTN).

Figure 2:
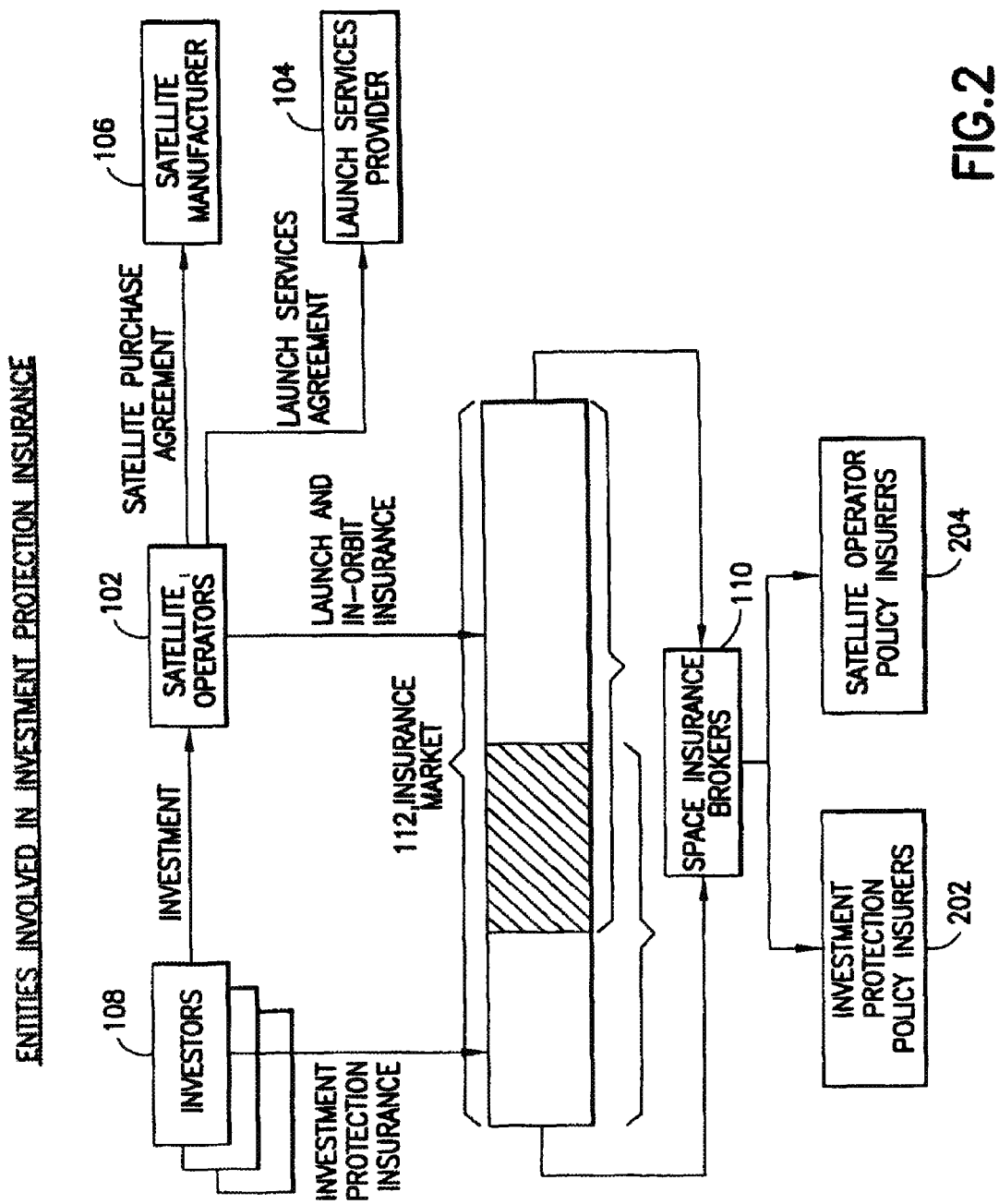
FIG. 2 illustrates relationships between parties in a system according to an example embodiment.

Referring to FIG. 2, some of the relationships of the entities identified in FIG. 1 are illustrated. Investors 108 make or place investments with satellite operators 102, in the form of stock purchases or subscriptions, or bond purchases. Satellite operators 102 enter into satellite purchase agreements with satellite builders/manufacturers 106. Satellite operators 102 also enter into launch services agreements with satellite launch service providers 104. Satellite operators 102 also obtain launch and in-orbit insurance from insurance market 112, procuring insurance from underwriters through the services of space insurance brokers 110. Investors 108 also obtain investment protection insurance from insurance market 112, procuring insurance from underwriters through the services of space insurance brokers 110. Space insurance brokers 110 place the policies of investors 108 and satellite operators 102 with investment protection policy insurers 202 and satellite operator policy insurers 204 respectively.

Figure 3:
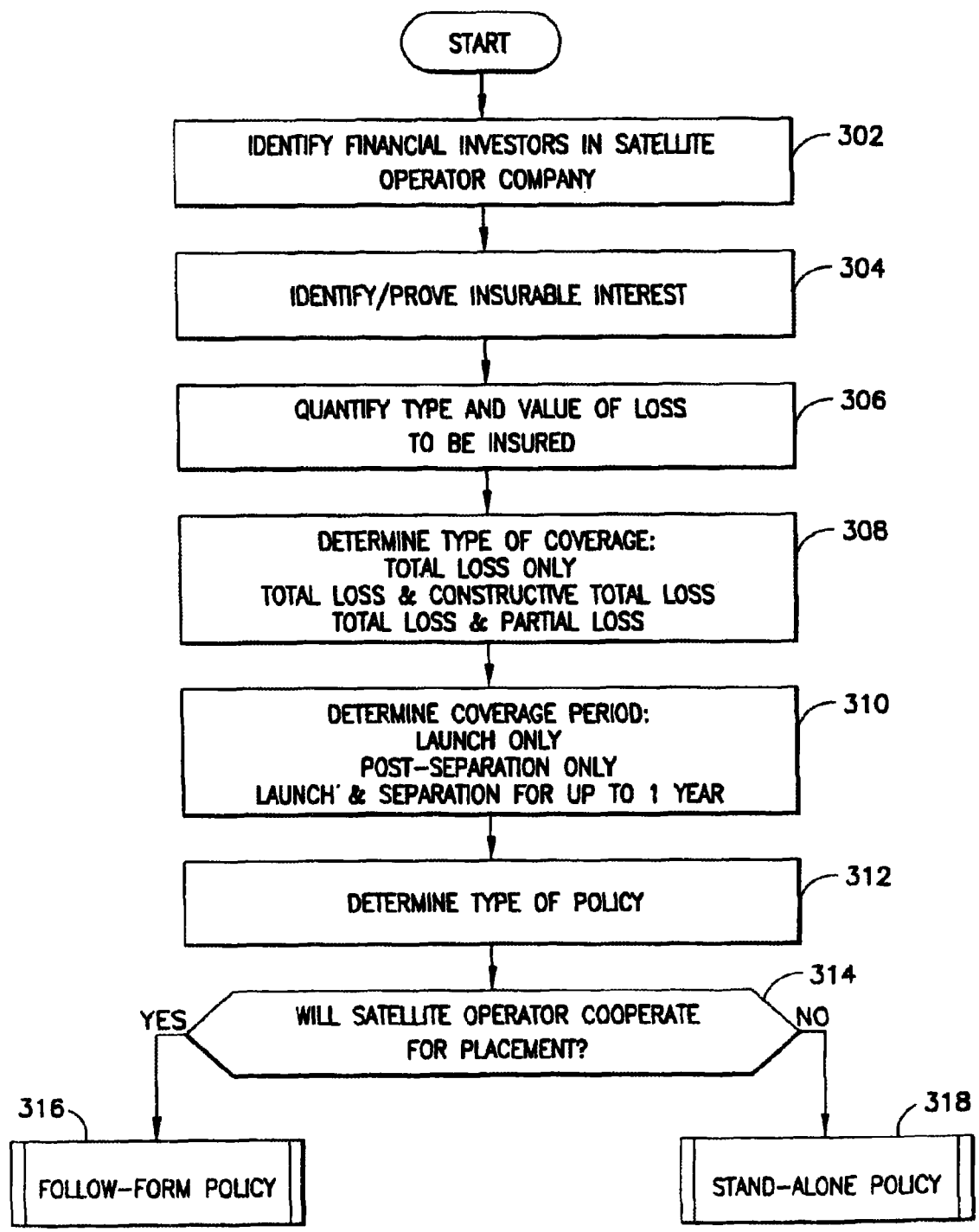
FIG. 3 illustrates steps in a method according to an example embodiment.

Referring to FIGS. 1 and 3, in an example embodiment, at step 302, system 100 identifies financial investors 108 in a satellite operator company 102.

At step 304, system 100 identifies and/or proves that investors 108 have an insurable interest.

At step 306, system 100 quantifies the type and value of loss to be insured.

At step 308, system 100 determines the type of coverage. Types of coverage may include but are not limited to: total loss only; total loss and constructive total loss; and total loss and partial loss.

At step 310, system 100 determines the coverage period. Coverage periods may include but are not limited to: launch only; post-separation only; launch and post-separation for up to 1 year.

At step 312, system 100 determines the type of policy, using information determined and identified in steps 302-310.

At step 314, system 100 determines whether satellite operator 102 will cooperate in placement of the policy.

Figure 4:
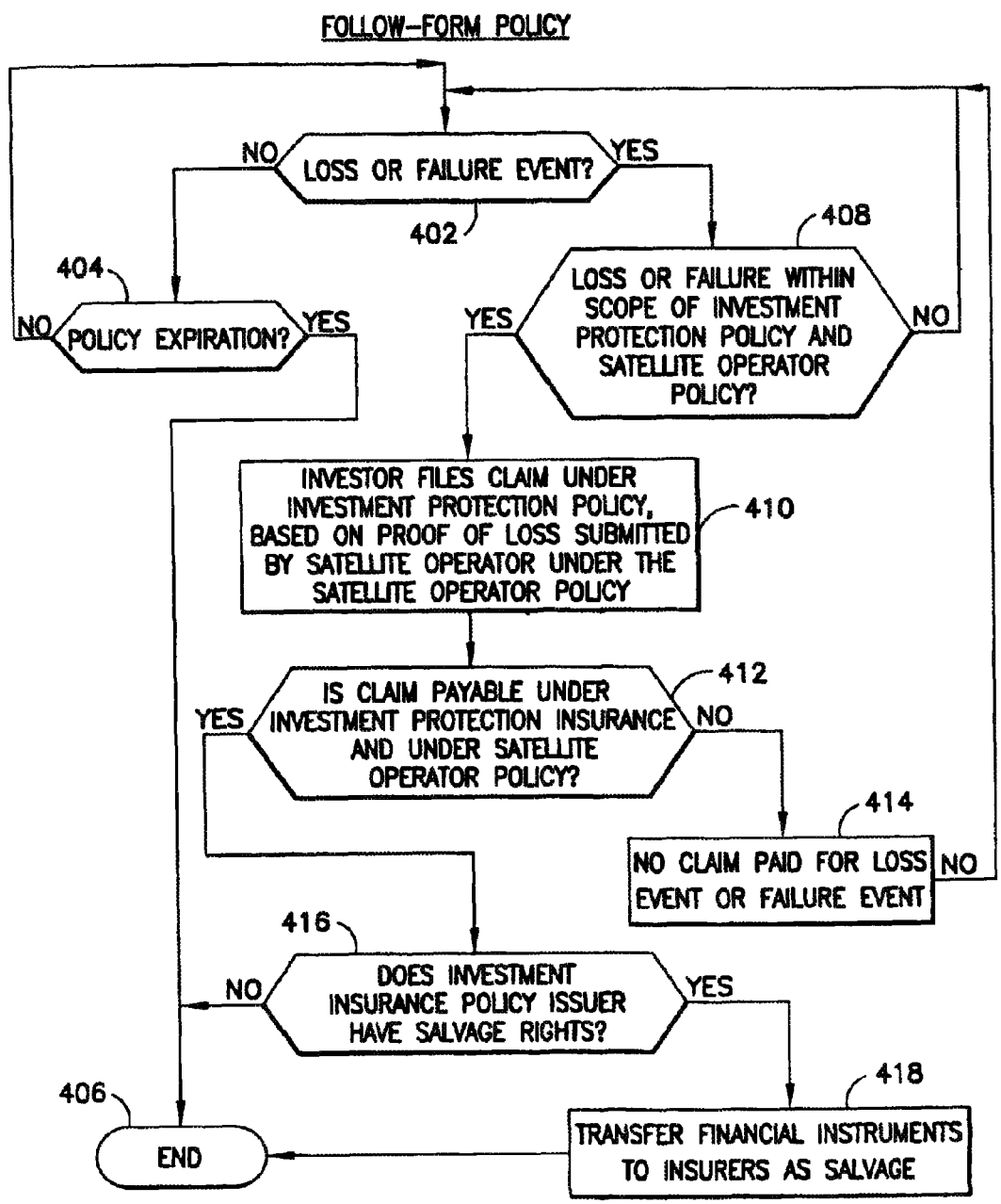
FIG. 4 illustrates steps in a method according to an example embodiment.

If at step 314, system 100 determines that satellite operator 102 will cooperate, then at step 316, system 100 issues a follow-form policy. FIG. 4 illustrates additional steps involved in the issue of a follow-form policy.

Figure 5:
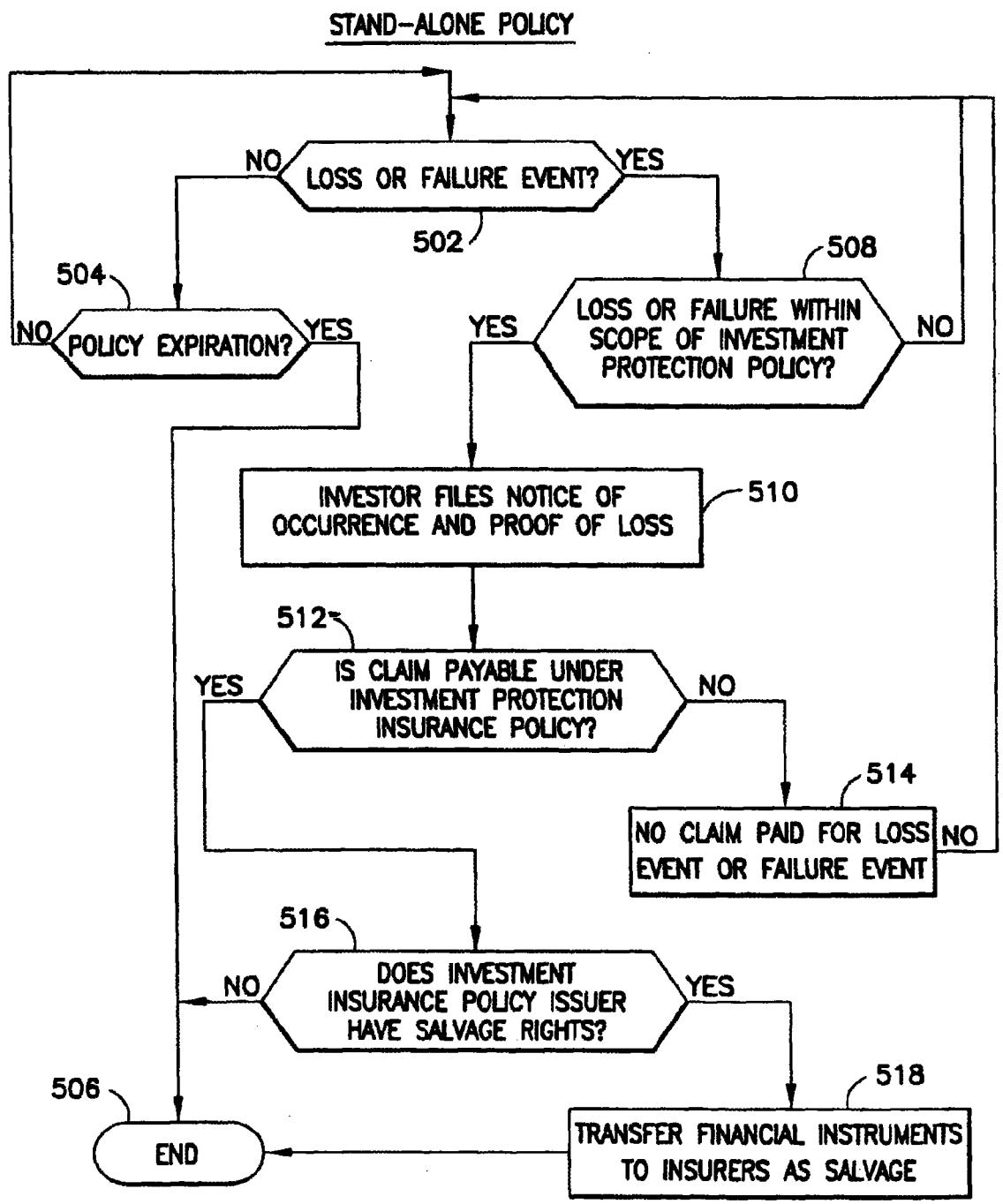
FIG. 5 illustrates steps in a method according to an example embodiment.

If at step 314, system 100 determines that satellite operator 102 will not cooperate, then at step 318, system 100 issues a stand-alone policy. FIG. 5 illustrates additional steps involved in the issue of a stand-alone policy.

Referring to FIGS. 1 and 4, after system 100 issues a follow-form policy at step 316, system 100 determines at step 402 whether there has been a failure event or loss event.

If at step 402 system 100 determines that there has not been a failure event or loss event, then at step 404 system 100 determines whether the policy has expired.

If the policy has not expired, then system 100 loops to step 402. If the policy has expired, then at step 406 the process ends.

If at step 402 system 100 determines that there has been a failure event or loss event, then at step 408 system 100 determines whether the failure event or loss event is within the scope of the investment protection policy and the satellite operator policy.

If the failure event or loss event is not within the scope of the investment protection policy and the satellite operator policy, then system 100 loops to step 402.

If the failure event or loss event is within the scope of the investment protection policy and the satellite operator policy, then at step 410, investor(s) 108 file claims under the investment protection policy. The investor claims are based on proof of loss submitted by the satellite operator under the satellite operator policy.

At step 412, system 100 determines whether the claim is payable under the investment protection insurance and under the satellite operator policy.

If the claim is not payable tinder the investment protection insurance and under the satellite operator policy, no claim is paid at step 414 for the failure event or the loss event, and system 100 loops to step 402.

If the claim is payable under the investment protection insurance and under the satellite operator policy, then at step 416, system 100 determines whether the issuer of the investment protection insurance has salvage rights.

If the issuer of the investment protection insurance has salvage rights, then at step 418, the financial instruments are transferred to the insurer or any future upside in financial instrument performance may be shared, in either case, as salvage and the process ends at step 406.

If the issuer of the investment protection insurance has no salvage rights, then the process ends at step 406.

Referring to FIGS. 1 and 5, after system 100 issues a standalone form policy at step 318, system 100 determines at step 502 whether there has been a failure event or loss event.

If at step 502 system 100 determines that there has not been a failure event or loss event, then at step 504 system 100 determines whether the policy has expired.

If the policy has not expired, then system 100 loops to step 502. If the policy has expired, then at step 506 the process ends.

If at step 502 system 100 determines that there has been a failure event or loss event, then at step 508 system 100 determines whether the failure event or loss event is within the scope of the investment protection policy.

If the failure event or loss event is not within the scope of the investment protection insurance policy, then system 100 loops to step 502.

If the failure event or loss event is within the scope of the investment protection policy, then at step 510, investor(s) 108 file a notice of occurrence and proof of loss under the investment protection insurance policy.

At step 512, system 100 determines whether the claim is payable under the investment protection insurance policy.

If the claim is not payable under the investment protection insurance policy, no claim is paid at step 514 for the failure event or the loss event, and system 100 loops to step 502.

If the claim is payable under the investment protection insurance policy, then at step 516, system 100 determines whether the issuer of the investment protection insurance policy has salvage rights.

If the issuer of the investment protection insurance policy has salvage rights, then at step 518, the financial instruments are transferred to the insurer or any future upside in financial instrument performance may be shared, in either case, as salvage, and the process ends at step 506.

If the issuer of the investment protection insurance has no salvage rights, then the process ends at step 506.

Figure 6:
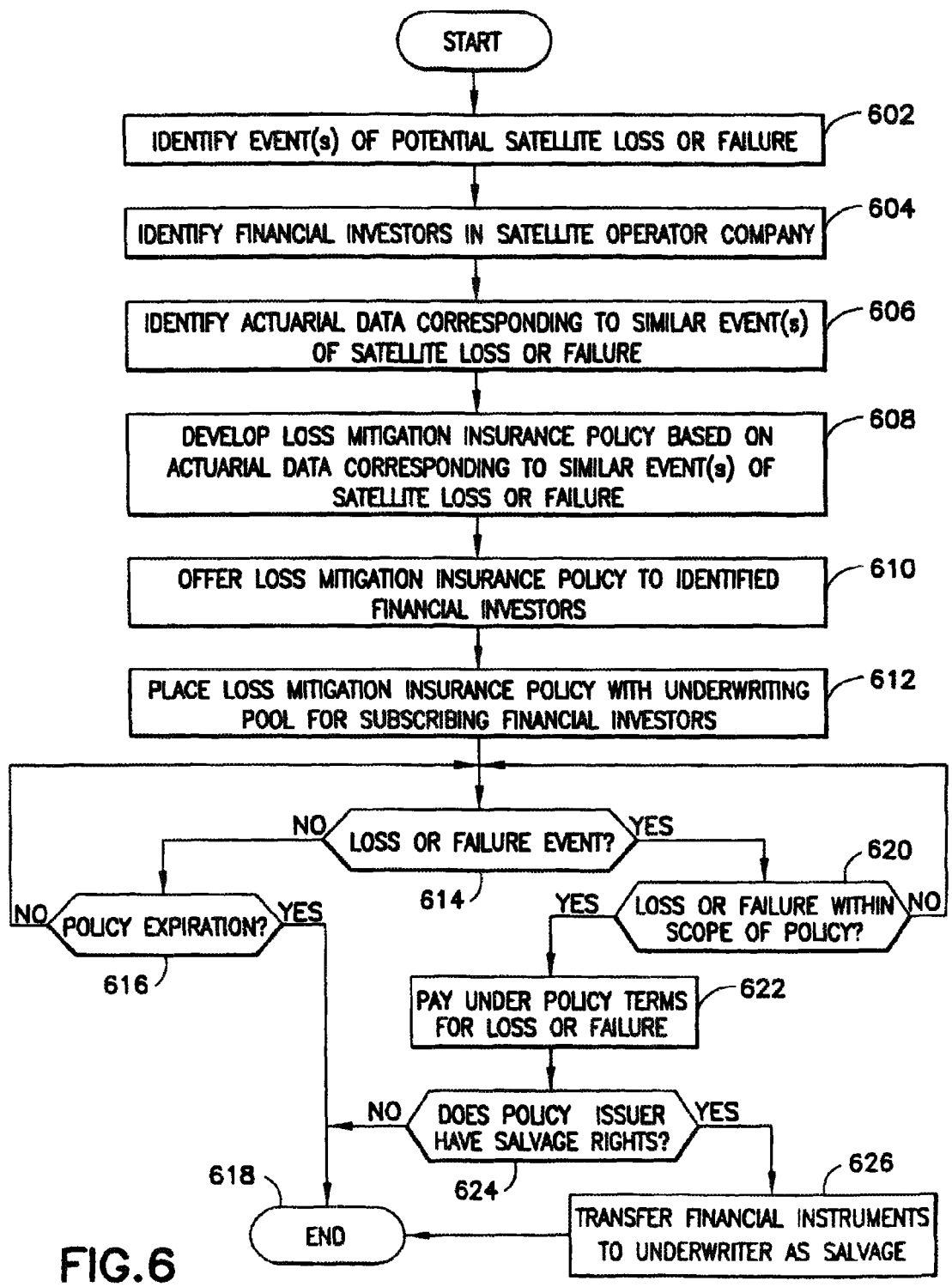
FIG. 6 illustrates steps in a method according to an example embodiment.

Referring to FIGS. 1 and 6, another example method begins at step 602 with system 100 identifying events of potential satellite loss or failure. There are many possible loss or failure events, some of which might include: failure before hold-down release; failure during main engine burn; booster separation failure; on-orbit check-out failure; total on-orbit power or propellant loss; and partial on-orbit power or propellant loss.

At step 604, system 100 then identifies a plurality of individual investors 108 who have invested in the satellite operator 102 and are interested in purchasing investment loss mitigation insurance.

At step 606, system 100 identifies actuarial data corresponding to similar events of satellite loss or failure.

At step 608, system 100 develops an investment loss mitigation insurance policy based on actuarial data corresponding to similar events of satellite loss or failure.

At step 610, system 100 offers the investment loss mitigation insurance policy to the identified financial investors 108.

At step 612, system 100 places the investment loss mitigation insurance policy for subscribing investors 108 with an underwriting pool 110.

Once the policy has been placed, then at step 614 system 100 determines whether a loss or failure event has occurred.

If at step 614 system 100 determines that no loss or failure event has occurred, then at step 616, system 100 determines whether the policy has expired. If the policy has not expired, system 100 loops to step 614. If the policy has expired, system 100 ends at step 618.

If at step 614 system 100 determines that a loss or failure event has occurred, then at step 620, system 100 determines whether the loss or failure event is within the scope of the policy. If the loss or failure event is not within the scope of the policy, then system 100 loops to step 614.

If the loss or failure event is within the scope of the policy, then at step 622 system 100 pays investors 108 under the policy terms for the loss or failure event.

At step 624, system 100 determines whether the policy issuer has any salvage rights, and if not, the process ends.

If at step 624, system 100 determines whether that the policy issuer has salvage rights, then at step 626 the financial instruments are transferred to the underwriter or any future upside in financial instrument performance may be shared, in either case, as salvage, and the process ends.

Figure 7:
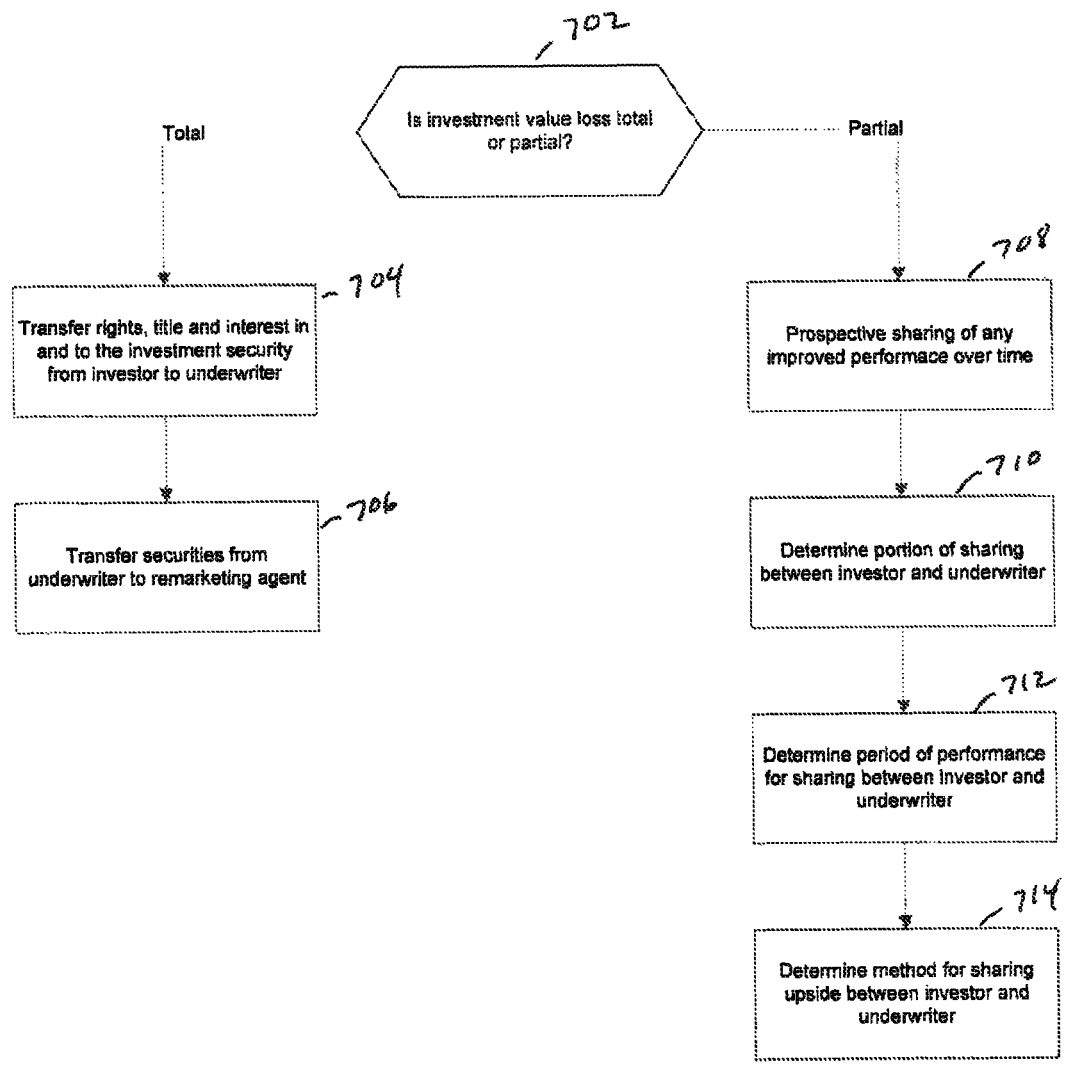
FIG. 7 illustrates steps in a method according to an example embodiment.

FIG. 7 illustrates steps in a method to cover total or partial loss in value of the financial instruments. Referring to FIGS. 1 and 7, at step 702, system 100 determines whether the financial instruments have lost all value, or whether the value lost is only partial.

If, at step 702, system 100 determines that the loss in value of the financial instruments was total, then at step 704, system 100 transfers all rights, title and interest in and to the financial instruments from the investor to the policy issuer.

At step 706, system 100 transfers the financial instruments from the policy issuer to a remarketing agent.

If, at step 702, system 100 determines that the loss in value of the financial instruments lost was partial, then at step 708, system 100 determines the prospective sharing between the investor and the policy issuer.

At step 710, system 100 determines the portion of sharing between the investor and the policy issuer. The respective portions are subject to negotiation (e.g. 50/50 or 75/25 . . . ).

At step 712, system 100 system 100 determines the period of performance for sharing between the investor and the policy issuer. The period is subject to negotiation (e.g., three, six, or twelve months after the loss date).

At step 714, system 100 determines the method of sharing between the investor and the policy issuer. The method of sharing is subject to negotiation e.g., securities liquidated, or issuer entitled to share only upon sale).

Figure 8:
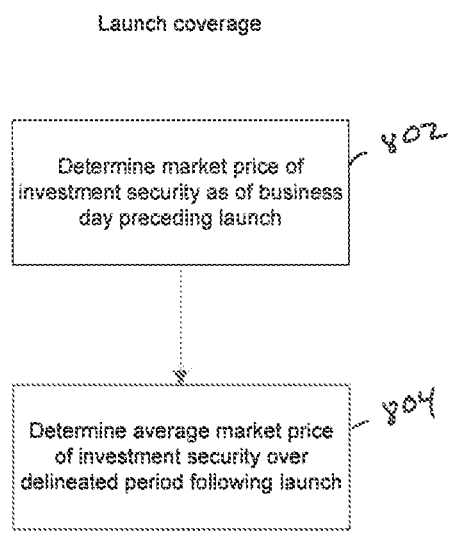
FIG. 8 illustrates steps in a method according to an example embodiment.

FIG. 8 illustrates steps in a method to provide launch coverage. Referring to FIGS. 1 and 8, at step 802, system 100 determines the market price of the financial instruments as of the business day immediately preceding launch.

At step 804, system 100 determines the average price of the financial instruments over a delineated period following launch.

Figure 9:
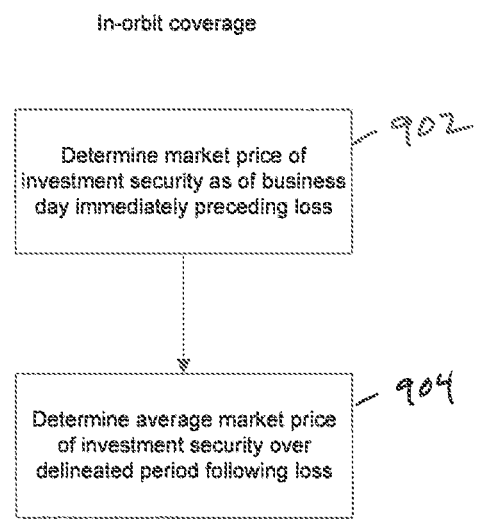
FIG. 9 illustrates steps in a method according to an example embodiment.

FIG. 9 illustrates steps in a method to provide in-orbit coverage. Referring to FIGS. 1 and 9, at step 902, system 100 determines the market price of the financial instruments as of the business day immediately preceding the loss event.

At step 904, system 100 determines the average price of the financial instruments over a delineated period following the loss event.

In the various embodiments described herein, there has been reference to investment protection insurance and investment loss mitigation insurance. There is no conceptual difference between the two and the use of two different terms is not intended to imply a difference.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A method for mitigating risk of satellite investment loss, the method comprising:
   identifying by a computing system having at least one processor and at least one memory at least one satellite loss event or failure event for a satellite that will be operated by a satellite operator company;
   identifying by the computing system actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure;
   developing by the computing system an investment loss mitigation insurance policy based at least in part on the identified actuarial data, including a salvage provision within the investment loss mitigation insurance policy, wherein the salvage provision is effective upon total loss of value in the debt or equity instruments;

offering by the computing system the investment loss mitigation insurance policy to financial investors holding debt or equity instruments of the satellite operator company; and placing by the computing system the investment loss mitigation insurance policy with an underwriting pool.

2. A method according to claim 1, further comprising identifying an actual satellite loss event or failure event;

determining whether the actual satellite loss event or failure event is covered by the investment loss mitigation insurance policy; and responsive to determining that the actual satellite loss event or failure event is covered, paying the financial investors.

3. A method according to claim 1, further comprising identifying an actual satellite loss event or failure event;

determining whether the debt or equity instruments of the satellite operator company have suffered a total loss of value;

determining whether the underwriting pool has salvage rights under the investment loss mitigation insurance policy; and responsive to determining that the debt or equity instruments have suffered a total loss of value and that the underwriting pool has salvage rights, transferring debt or equity instruments to the underwriting pool as salvage.

4. A method according to claim 3, further comprising transferring the debt or equity instruments from the underwriting pool to a remarketing agent at a discount.

5. A method according to claim 1, wherein the at least one satellite loss event or failure event is a launch failure.

6. A method according to claim 1, wherein the at least one satellite loss event or failure event is a launch loss.

7. A method according to claim 1, wherein the at least one satellite loss event or failure event is an in-orbit failure.

8. A method according to claim 1, wherein the at least one satellite loss event or failure event is a premature in-orbit loss of capacity.

9. A method according to claim 1, wherein offering the investment loss mitigation insurance policy to financial investors occurs a predetermined number of days before launch.

10. A method according to claim 1, wherein offering the investment loss mitigation insurance policy to financial investors occurs after successful in-orbit check-out and a predetermined number of days before annual expiry.

11. A method according to claim 1, wherein the underwriting pool is at least partially in a financial products market.

12. A method according to claim 1, wherein the underwriting pool is at least partially in a satellite property insurance underwriting market.

13. A method according to claim 1, wherein identifying actuarial data corresponding to prior satellite loss events or failure events substantially corresponding to the at least one satellite loss event or failure event considers an agreed value of investment based on a set financial instrument value.

14. A method according to claim 1, wherein identifying actuarial data corresponding to prior satellite loss events or failure events substantially corresponding to the at least one satellite loss event or failure event considers an intrinsic value of investment based on recognized value metrics or methodologies.

15. A method according to claim 1 further comprising determining the final pool of investors and the adjusted value of their investment in the satellite operator company.

16. A method according to claim 1 further comprising determining the final insured amount at the time of attachment of risk.

17. A method according to claim 1, wherein the at least one satellite loss event or failure event for a satellite is a total loss.

18. A method according to claim 1, wherein the at least one satellite loss event or failure event for a satellite is a partial loss.

19. A method according to claim 1, wherein the at least one satellite loss event or failure event for a satellite is a reduction in expected lifetime.

20. A method according to claim 1, wherein the at least one satellite loss event or failure event for a satellite is a reduction in available power.

21. A non-transitory computer-readable medium having computer executable software code stored thereon, the code for mitigating risk of satellite investment loss the code comprising:

code to identify at least one satellite loss event or failure event for a satellite that will be operated by a satellite operator company;

code to identify actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure;

code to develop an investment loss mitigation insurance policy based at least in part on the identified actuarial data, including a salvage provision within the investment loss mitigation insurance policy, wherein the salvage provision is effective upon total loss of value in the debt or equity instruments;

code to offer the investment loss mitigation insurance policy to financial investors holding debt or equity instruments of the satellite operator company; and code to place the investment loss mitigation insurance policy with an underwriting pool.

22. A programmed computer for mitigating risk of satellite investment loss, comprising:

a memory having at least one region for storing computer executable program code; and a processor for executing the program code stored in the memory, wherein the program code comprises:

code to identify at least one satellite loss event or failure event for a satellite that will be operated by a satellite operator company;

code to identify actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure;

code to develop an investment loss mitigation insurance policy based at least in part on the identified actuarial data, including a salvage provision within the investment loss mitigation insurance policy, wherein the salvage provision is effective upon total loss of value in the debt or equity instruments;

code to offer the investment loss mitigation insurance policy to financial investors holding debt or equity instruments of the satellite operator company; and code to place the investment loss mitigation insurance policy with an underwriting pool.

23. A method for mitigating risk of satellite investment loss, the method comprising:

identifying by a computing system having at least one processor and at least one memory at least one satellite loss event or failure event for a satellite that will be operated by a satellite operator company;

identifying by the computing system actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure;

developing by the computing system an investment loss mitigation insurance policy based at least in part on the identified actuarial data, including a salvage provision within the investment loss mitigation insurance policy, wherein the salvage provision is effective upon partial loss of value in the debt or equity instruments;

offering by the computing system the investment loss mitigation insurance policy to financial investors holding debt or equity instruments of the satellite operator company; and placing by the computing system the investment loss mitigation insurance policy with an underwriting pool.

24. A method according to claim 23, further comprising:

identifying by the computing system an actual satellite loss event or failure event;

determining by the computing system whether the debt or equity instruments of the satellite operator company have suffered a partial loss of value;

determining by the computing system whether the underwriting pool has salvage rights under the investment loss mitigation insurance policy; and responsive to determining that the debt or equity instruments have suffered a partial loss of value and that the underwriting pool has salvage rights, sharing any future upside in financial instrument performance as salvage.

25. A method according to claim 24, further comprising determining a portion of sharing between the investor and the underwriting pool.

26. A method according to claim 24, further comprising determining a period of performance for sharing between the investor and the underwriting pool.

27. A method according to claim 24, further comprising determining how to share upside between the investor and the underwriting pool.

* * * * *